United States Patent

[11] 3,608,925

| [72] | Inventor | Peter H. Murphy |
| | | 241 John St., Santa Cruz, Calif. 95060 |
| [21] | Appl. No. | 822,546 |
| [22] | Filed | May 7, 1969 |
| [45] | Patented | Sept. 28, 1971 |

[54] APPARATUS FOR OFFSETTING CENTRIFUGAL FORCE AFFECTING MOTOR VEHICLES
10 Claims, 3 Drawing Figs.

[52] U.S. Cl. .................................................. 280/112,
280/124
[51] Int. Cl. ...................................................... B60g 21/10
[50] Field of Search ........................................ 280/112,
112.1, 6, 6.1, 6.11, 124 F

[56] References Cited
UNITED STATES PATENTS

| 3,124,368 | 3/1964 | Corley et al. .................. | 280/6 |
| 3,257,122 | 6/1966 | Vogel ............................. | 280/112 (.1) |
| 3,396,984 | 8/1968 | Cadiou .......................... | 280/6.11 |

Primary Examiner—Leo Friaglia
Attorney—Paul B. Fihe

ABSTRACT: The invention is a suspension for motor vehicles and the like which adjustably controls the wheel height of the vehicle relative to the chassis during turns. Sensors convert vehicle turn angle and velocity information into electrical signals for initiating pressure changes in selected expansible springs for adjustably offsetting the centrifugal force occurring during turns.

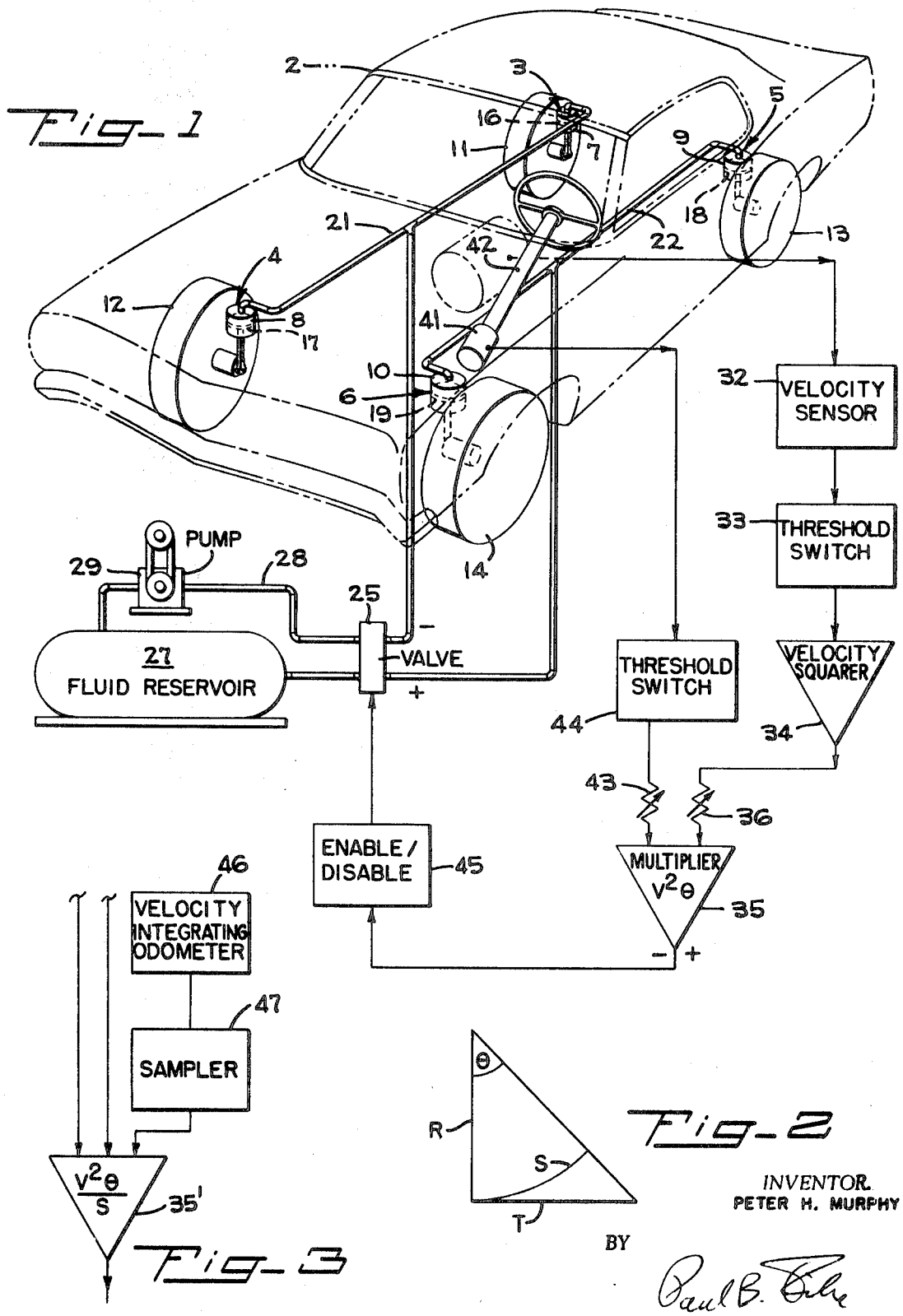

APPARATUS FOR OFFSETTING CENTRIFUGAL FORCE AFFECTING MOTOR VEHICLES

BACKGROUND OF THE INVENTION

The invention relates to vehicle suspension systems and more particularly to a suspension system which compensates for the reaction of a vehicle during turns at moderate and high speed.

It is well known that when a vehicle such as an automobile goes through a turn, even at moderate speed, the vehicle chassis tends to tilt in reaction to centrifugal force. The centrifugal force is proportional to the square of the velocity and inversely proportional to the radius of the turn. Accordingly, at relatively high velocity and short turn radius, the centrifugal force increases appreciably thereby creating a severe vehicle reaction force tending to tilt or roll the vehicle. Such a force might readily overcome the gravitational and frictional forces holding the vehicle on the road thereby causing it to lose contact with the road and overturn.

To compensate for reaction forces encountered during high-speed turns, various mechanisms are employed. The most familiar type are mechanical springs which load by twisting, bending or compressing in response to increased forces during a turn, thereby resisting tilt. It is well known by the number of accidents that occur on even the most modern highways that this system is inadequate. Other more sophisticated systems, employ pneumatic or hydraulic springs which tend to level in the vehicle in response to torque differentials associated with the driving wheels. Such systems work well in some instances but are subject to activation when torque differentials exist for other reasons than that of moderate- or high-speed turns. Additionally, extra mechanical linkages must be added to the vehicle transmission, thereby complicating an already complex mechanism. The aforementioned systems are generally inadequate to offset centrifugal force at various speeds and turn angles.

SUMMARY OF THE INVENTION

It is an object of the present invention to adjustably offset centrifugal forces occurring during turns with a suspension system which senses and responds to both the vehicle turn angle and velocity.

The present apparatus adjusts the relative lateral height of a steered vehicle by offsetting tilt or roll during a turn. A new suspension system senses the velocity and turn angle to which the vehicle is reacting. The turn angle is measured relative to steering wheel changes, while the velocity is measured directly from the drive train or wheels of the vehicle. In response to these measurements, extensible supports are activated on either side of the vehicle to compensate for tilt due to turning.

BRIEF DESCRIPTION OF THE DRAWING

FIG. 1 is a diagrammatic view of a suspension of the present invention operated by a control system which includes turn angle and velocity sensors.

FIG. 2 is a geometric illustration of some of the parameters measured by the sensors and their associated circuits.

FIG. 3 is an alternate embodiment of one of the circuits shown in FIG. 1.

DESCRIPTION OF THE PREFERRED EMBODIMENTS

In FIG. 1 the vehicle chassis diagrammatically indicated at 2 rides on wheels 11, 12, 13 and 14. Extensible springs, such as the fluidic springs 3, 4, 5, 6 suspend the wheels from the chassis and provide a fluid cushion to insulate the chassis from road shock. Each spring 3, 4, 5, 6 has a fluid-receiving cylinder 7, 8, 9, 10 and a respective movable piston 16, 17, 18, 19 residing in the cylinder. Each piston includes a connecting rod attached to a wheel axle. Each cylinder is mounted to the chassis in the manner in which conventional shock absorbers are mounted.

The present suspension system is adapted to laterally tilt the vehicle to either side using the above-mentioned suspension system. Each cylinder 7, 8, 9, 10 on either side of the vehicle is provided with a port for transmitting fluids under pressure. Cylinders on the same side of the vehicle, 7, 8, and 9, 10 are connected by fluid linkages or conduit 21 and 22, respectively, to maintain the same pressure in both cylinders on the same side, although separate conduits can be utilized. Both fluid conduits 21 and 22 are terminated in a valve 25. The conduits should be preferably kept as short as possible and be of a diameter wide enough to rapidly transmit sufficient quantities of fluid to move the pistons.

Valve 25 is of a standard fast-acting, electrically controlled type, such as a solenoid-activated spool valve, linking one of the fluid conduits 21 or 22 with a fluid reservoir 27 and the other with an exhaust tube 28 depending on the polarity of the electrical signal. The extent to which the valve is opened, so that the fluid conduit has its pressure increased or decreased, depends on the magnitude of the electrical signal transmitted to valve 25. For example, a positive electrical signal would connect one fluid conduit 21 to the fluid reservoir 27 while connecting the second conduit 22 to the exhaust tube 28. A negative electrical signal would do the opposite. A large positive or negative signal would open valve 25 to its fullest extent directly coupling to fluid reservoir 27 with its connected fluid conduit 21 or 22. A small would would only allow only a small change in pressure between the fluid conduit and the fluid reservoir and the exhaust tube. Valve 25 also includes an electrical reset feature whereby the valve connects fluid conduits 21 and 22 together at a preset pressure while returning excess fluid to reservoir 27 when the polarity of the electrical control signal is reversed. The equalization of pressure in the fluid conduits 21 or 22 takes place whenever such a polarity-reversed electrical signal is received. Generally, a polarity-reversing signal would be generated after a vehicle goes through the maximum angle of a turn as explained hereinafter.

In general, the fluid reservoir 27 is maintained at a pressure high enough to enable the pressure to simultaneously push two connected pistons 16, 17, or 18, 19 a maximum of 2 inches in approximately 1 second when one of the conduits 21 and 22 is directly connected to the fluid reservoir 27. Pump 29 is connected to the exhaust tube 28 for returning fluid exhausted from one of the conduits 21 or 22 to the fluid reservoir 27. The capacity of the pump should be sufficient to withdraw two connected pistons 16, 17 or 18, 19 2 inches in approximately 1 second.

Pump 29 is electrically activated each time the valve opens and closes. When valve 25 opens to allow increased pressure in one of the conduits 21 or 22 the pump is connected by the valve of the other conduit to reduce its pressure. Fluid is conserved by returning it to the reservoir 27.

The fluid which is used is selected generally for its rapid flow rate. Since the cylinder and piston arrangement normally should provide shock absorption, the fluid should also be compressible. Accordingly, a gas, preferably air, is used. The gas should be kept dry by a hydroscopic substance attached to the interior conduit and reservoir walls. Accumulated condensation is removed by using the pump 29 to lower the pressure in each cylinder during periodic maintenance intervals.

The electrical signal which operates valve 25 is derived from two sources: the turn angle of the vehicle and its velocity. As mentioned previously, the magnitude of the electric signal determines the extent to which valve 25 opens, whereas the polarity of the signal determines which of the fluid conduits will be coupled to fluid reservoir 27 and which will be coupled to the exhaust tube 28. A reversal in polarity of the electric signal indicates that the maximum of the turn angle has been attained. The valve 25 then begins returning the suspension system to its normal position by equalizing pressure in both conduits 21, 22 and establishing a preset operating pressure by means of pump 29.

The velocity component of the signal originates at the velocity sensor 32 which generates an electrical signal, i.e.

voltage, in response to turns of a wheel-driving member of the vehicle transmission or alternatively, directly from a wheel. For example, a simple series or shunt wound direct current generator will supply such a proportional signal. Velocity sensor 32 is connected to a threshold switch 33. The switch assumes a closed position when the signal sensor 32 exceeds a preset limit. For example, it has been found desirable to activate the centrifugal force compensation apparatus of the present invention only when the vehicle assumes a velocity above 40 miles per hour. Below such velocity the output from the threshold switch 33 would normally be zero. It will be realized that the threshold limit will be set at different positions depending upon the type of roads traveled, the type of driver, etc.

The velocity signal itself could be used to compensate for the vehicle tilt or roll reaction to centrifugal force. However, in general it is better to square the velocity signal since centrifugal force varies as the square of the velocity. An operational amplifier 34, capable of squaring input signals is connected to the threshold switch 33. A variable resistor 36 is connected to the velocity-squaring operational amplifier 34 to normalize or adjust its output to a calibrated level. The velocity-squared control signal is then applied to a multiplying operational amplifier 35 for application to the control valve 25. Operational amplifier 35, of the analog circuit type, multiplies the velocity-squared signal by a second signal representative of the angle through which the vehicle is turning.

The second signal, hereafter referred to as the turn angle signal is generated by a transducer which converts turning motion of the vehicle to a proportional electric signal. A preferred means for deriving the turn angle signal is from a potentiometer 41 connected to steering wheel shaft 42. The potentiometer 41 is biased so that turns in one direction give a positive output signal whereas turns in the opposite direction give a negative output signal. After the maximum turn angle has been attained the polarity of the output signal is reversed thereby causing the suspension system to assume a configuration in which the extension of each spring 3, 4, 5, 6, is approximately equal at a predetermined height.

The turn angle signal represents the angle by which the vehicle deviates from its last straight line trajectory. In FIG. 2 this angle is indicated as $\theta$. The arc length through which the car is turning is indicated by the distance S, while the vehicle's original straight line trajectory is indicated by a line T. The radius of curvature through which the car is turning is represented by the straight line R.

Centrifugal force is directly proportional to the velocity squared and to the inverse of the turning radius. The turning radius is equal to the arc length divided by the turning angle, i.e. $R=S/\theta$. In practice it is difficult to use any particular large value for $S$ since the arc length of a turn is generally not known before a turn is made. Accordingly, in the most simple embodiment of the present invention the arc length is taken to be a constant and only the turn angle is used to represent the turning radius in the reaction to centrifugal force.

In another embodiment of the invention partially shown in FIG. 3, an electrical odometer 46 generates the control signal for operating valve 25 by taking into account incremental measurement of the arc length $S$. The odometer 46 is a velocity-integrating circuit which continuously determines distances and provides an arc length proportional signal when triggered by a turn angle exceeding its preset limits. The arc length signal is transmitted to a sampling circuit 47 such as a free-running multivibrator which pulses the velocity-integrating odometer 46 at periodic short intervals to detect the arc length $S$. This signal is then combined with the velocity-squared input and the turn angle input in the multiplying operational amplifier 35' or in a separate operational amplifier so that the output signal is proportional to $V^2\theta/S$.

The output signal is sent through threshold switch 44 to a variable resistor 43 which calibrates the turn angle signal. The threshold switch 44 closes when the turn angle signal exceeds a preset level. Thus the tilt compensation apparatus of the present invention remains insensitive to small steering wheel variations which would normally occur during ordinary straight line driving conditions. When the turn angle signal exceeds the preset limit the threshold switch 44 is closed and transmits the turn angle signal to the multiplying operational amplifier 35. An enable/disable manual switch 45 is inserted between the operational amplifier 35 and the valve 25 so that the vehicle operator may bypass the entire system when desired.

In operation, the tilt system will respond only to turn angles and velocities above the preset limitations in threshold switches 33 and 44. If either velocity or turn angle signal component is below the respective preset limit, the output of the operation amplifier 35 will be zero and the valve will remain inactive. The slightest amount of turn angle variation exceeding the preset limitation which occurs at a velocity greater than the respective preset limit produces an electrical signal which initiates fluid transfer into an appropriate fluid conduit 21 or 22.

After the maximum turn angle is achieved the turn angle signal is reversed in polarity thereby causing valve 25 to return conduits 21 and 22 to a preset normal operating pressure. After the valve is reset to its normal operating position further turns in either direction will again activate the system. Appropriate normalization or calibration of the variable resistors 36 and 43 is necessary to set the desired conditions for full opening of the valve 25. Full scale valve openings should allow a 2-inch raising on one side of the vehicle and a 1-inch lowering of the opposite side for an approximate 3-inch tilt differential which is expected to be the maximum necessary compensating displacement However, it will be realized that these values are not critical and more suitable values may be found to meet the particular driving characteristics of each operator. These characteristics may be taken into account by an applied setting of the variable resistors, 36 and 43. The variable resistors 36 and 43 may also be set to take into account other proportionality factors on which the centrifugal force depends.

What is claimed is:

1. Apparatus for adjusting the relative lateral height of a wheeled vehicle in response to turns comprising,
   extensible supports suspending the vehicle wheels from the vehicle chassis,
   power means connected to said supports and arranged to extend said supports on one side of the vehicle and to simultaneously allow retraction of said supports on the opposite side of the vehicle, and
   sensor means operative in response to both vehicle velocity and turn angle for actuating said power means to offset the vehicle tilt reaction to turns in either direction.

2. The apparatus of claim 1 wherein,
   said sensor means generates a control signal, and
   said power means is connected for energization by said control signal.

3. The apparatus of claim 2 wherein said control signal includes a component derived from the vehicle turn angle.

4. The apparatus of claim 2 wherein said control signal includes a component derived from the vehicle velocity.

5. The apparatus of claim 4 wherein said velocity component of said control signal is proportional to the square of the velocity.

6. The apparatus of claim 2 wherein said control signal includes a component derived from arc length segments through which the vehicle is turning.

7. Apparatus for offsetting centrifugal force experienced by a vehicle during a turn comprising,
   a plurality of extensible supports joining the vehicle wheels to the vehicle chassis,
   a fluid reservoir
   conduit means for connecting said fluid reservoir to said extensible supports,
   control valve mean for regulating the flow of fluid with respect to said reservoir and said conduit means, said control valve capable of directing proportional quantities of fluid to the hydraulic supports undergoing compression during a turn in response to a control signal, and analog circuit means for generating a control signal in said control valve means proportional to the magnitude of centrifugal force a vehicle experiences in making a turn.

8. The apparatus of claim 7 wherein said control signal generation means includes a first sensor for sensing vehicle velocity and producing a first proportional signal in response thereto, a second sensor for sensing vehicle turn angles and producing a second proportional signal in response thereto and means for multiplying said first and second proportional signals.

9. The apparatus claim 8 wherein a squaring circuit receives said second signal proportional to velocity and transmits said signal after squaring to said analog circuit means.

10. The apparatus of claim 7 further defined by a pump connecting said valve to said hydraulic reservoir for pumping said hydraulic supports when actuated by said valve.